United States Patent
Li

(10) Patent No.: US 7,551,334 B2
(45) Date of Patent: Jun. 23, 2009

(54) BACKGROUND SUPPRESSION METHOD AND APPARATUS

(75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 643 days.

(21) Appl. No.: 11/185,156

(22) Filed: Jul. 20, 2005

(65) Prior Publication Data

US 2007/0019257 A1 Jan. 25, 2007

(51) Int. Cl.
G03F 3/08 (2006.01)
H04N 1/40 (2006.01)
G06T 5/00 (2006.01)
H04N 1/407 (2006.01)
H04N 1/409 (2006.01)

(52) U.S. Cl. .................... 358/518; 358/3.23; 358/3.26; 358/3.27

(58) Field of Classification Search .................. 358/1.9, 358/462, 464, 518, 3.01, 3.23, 3.26, 3.27, 358/512, 515, 516, 517, 520, 448, 465, 466; 382/168, 154, 254, 282, 169, 172, 171, 162, 382/163, 167
See application file for complete search history.

(56) References Cited

U.S. PATENT DOCUMENTS

| | | | | |
|---|---|---|---|---|
| 5,343,311 A | * | 8/1994 | Morag et al. ................. | 358/518 |
| 5,420,704 A | * | 5/1995 | Winkelman ................. | 358/520 |
| 5,563,988 A | * | 10/1996 | Maes et al. ................. | 345/421 |
| 5,631,748 A | * | 5/1997 | Harrington ................. | 358/502 |
| 5,668,890 A | * | 9/1997 | Winkelman ................. | 382/167 |
| 5,832,105 A | * | 11/1998 | Morimoto et al. ........... | 382/151 |
| 5,848,183 A | * | 12/1998 | Farrell ........................ | 382/172 |
| 5,850,298 A | * | 12/1998 | Narahara et al. ............ | 358/518 |
| 5,900,953 A | * | 5/1999 | Bottou et al. ............... | 358/540 |
| 6,137,904 A | * | 10/2000 | Lubin et al. ................. | 382/162 |
| 6,198,845 B1 | * | 3/2001 | Tse et al. .................... | 382/169 |
| 6,323,957 B1 | * | 11/2001 | Ball ............................ | 358/1.9 |
| 6,400,844 B1 | * | 6/2002 | Fan et al. .................... | 382/173 |
| 6,441,865 B1 | * | 8/2002 | Hailey ........................ | 348/586 |
| 6,594,388 B1 | * | 7/2003 | Gindele et al. ............. | 382/167 |
| 6,618,444 B1 | * | 9/2003 | Haskell et al. ......... | 375/240.24 |
| 6,633,670 B1 | * | 10/2003 | Matthews ................... | 382/176 |
| 6,674,899 B2 | * | 1/2004 | Nagarajan et al. ........... | 382/168 |
| 6,839,151 B1 | * | 1/2005 | Andree et al. ................ | 358/2.1 |
| 6,944,353 B2 | * | 9/2005 | Matsuda ..................... | 382/274 |
| 6,995,866 B2 | * | 2/2006 | Feng et al. ................... | 358/1.9 |
| 7,050,650 B2 | * | 5/2006 | Maurer et al. ............... | 382/275 |
| 7,126,718 B1 | * | 10/2006 | Newman et al. ............. | 358/1.9 |
| 7,170,645 B2 | * | 1/2007 | Kim et al. ................... | 358/3.27 |
| 7,200,263 B2 | * | 4/2007 | Curry et al. ................. | 382/154 |
| 7,233,695 B2 | * | 6/2007 | Curry et al. ................. | 382/162 |
| 7,236,641 B2 | * | 6/2007 | Curry et al. ................. | 382/254 |
| 7,319,542 B2 | * | 1/2008 | Sievert et al. ................ | 358/1.9 |
| 2001/0055122 A1 | * | 12/2001 | Nagarajan et al. ............ | 358/1.9 |
| 2002/0076102 A1 | * | 6/2002 | Nagarajan et al. ........... | 382/168 |

(Continued)

*Primary Examiner*—Twyler L Haskins
*Assistant Examiner*—Jonathan R Beckley
(74) *Attorney, Agent, or Firm*—Fay Sharpe LLP

(57) ABSTRACT

An original image is received in a red-green-blue color space. Pixels in the original image are converted to a luminance-chrominance color space. Background pixels in the original image are determined by comparing a luminance value of each pixel to a selectable luminance threshold, and comparing chrominance value of each pixel to a predetermined chrominance threshold. Chrominance values of the background pixels in each chrominance channel are adjusted.

19 Claims, 3 Drawing Sheets

U.S. PATENT DOCUMENTS

| | | |
|---|---|---|
| 2002/0159080 A1 | 10/2002 | Feng et al. |
| 2003/0099407 A1* | 5/2003 | Matsushima ................ 382/274 |
| 2003/0152285 A1* | 8/2003 | Feldmann et al. ........... 382/274 |
| 2004/0052429 A1* | 3/2004 | Curry et al. ................. 382/274 |
| 2004/0071362 A1* | 4/2004 | Curry et al. ................. 382/274 |
| 2005/0047655 A1* | 3/2005 | Luo et al. ................... 382/167 |
| 2005/0213125 A1* | 9/2005 | Smith et al. ................. 358/1.9 |
| 2006/0244982 A1* | 11/2006 | Zeng .......................... 358/1.9 |
| 2006/0274376 A1* | 12/2006 | Bailey et al. ............... 358/3.26 |

* cited by examiner

FIG. 3
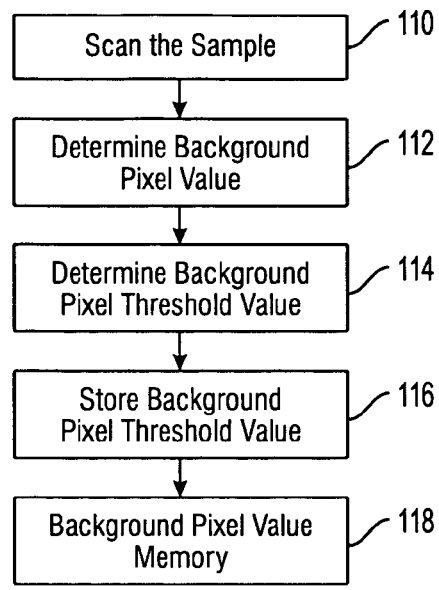
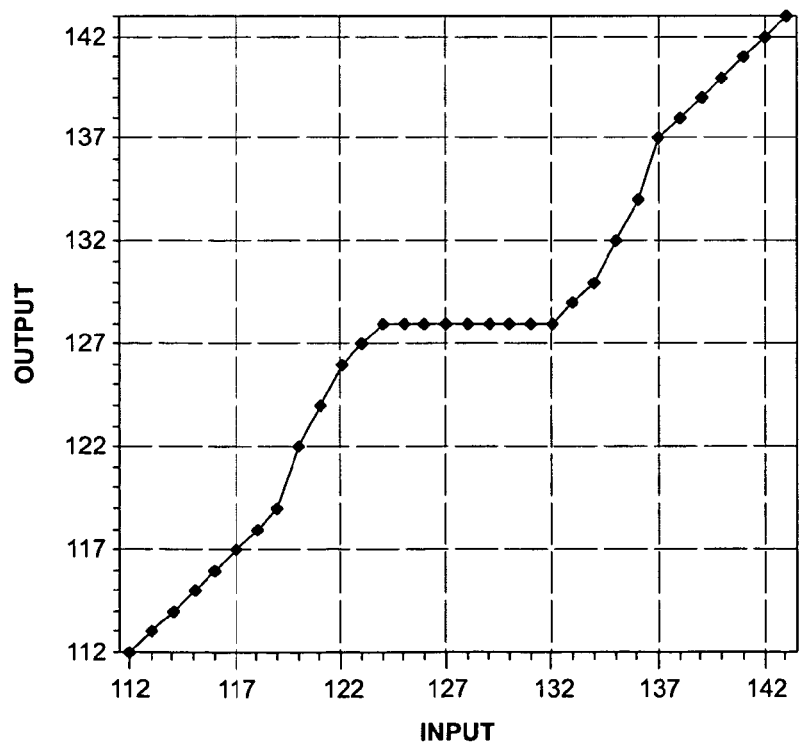
FIG. 4

BACKGROUND SUPPRESSION METHOD AND APPARATUS

BACKGROUND

The present exemplary embodiment relates to document processing systems. It finds particular application in conjunction with background suppression in color scanning and copying systems and will be described with a particular reference thereto. However, it is to be appreciated that the present exemplary embodiment is also amenable to other document processing systems and like applications.

Typically, in a digital reproduction device, a document or image is scanned by a digital scanner which converts the light reflected from the document into electrical charges representing the light intensity from predetermined areas (pixels) of the document. The pixels of image data are processed by an image processing system which converts the pixels of image data into signals which can be utilized by the digital reproduction machine to recreate the scanned image.

Sometimes the white regions in the original are not imaged as white regions in the produced document. Typically, digital scanning and multifunction devices provide the function of automatic background suppression to make white regions in the original white on scanned images or copies. The quality of background suppression is of great importance to many customers. Background detection and suppression in color systems is more challenging than in monochrome systems due to the more complex nature of the problem.

One method of color background detection/suppression is to perform the noise suppression in each of the RGB channels separately. Initially, the background or white pixel value is determined by any of known methods as, for example, described in U.S. Pat. No. 6,674,899 to Nagarajan, identified below. The background pixel values of each channel are detected separately and mapped to 255 in each individual RGB channel. However, this method can produce artifacts in the resultant image as each channel's value of white pixel may vary. For example, the white pixel value in the blue channel may be 250, while the white pixel value in the green channel may be 235. By mapping the background pixels in each channel to 255, the color in the resultant image may be changed. Such technique could be expensive as the processing of three channels is required.

Another method is to perform the background detection/suppression after the document processing system input is converted to luminance/chrominance color space such as CIE L*a*b*, where L* represents the dark to light lightness dimension or luminosity, and a*, b* represent the chrominance components which define the difference between a color and a chosen reference color of the same luminous intensity. Typically, the colored document is scanned by a scanner using a set of red, green, and blue sensors which produces a data representation in terms of the RGB signals at each pixel location. The data is then converted into a luminance/chrominance color space.

Typically, the background suppression is performed in the luminance channel. Due to the distribution of the chrominance channel values in the background region, suppressing the luminance channel alone does not suppress background completely. In order to fully suppress the background, the chrominance channels are adjusted. However, the chrominance channels are adjusted independently of each other's chrominance information and also independently of the luminance channel information. This leads to a color shift in some regions.

There is a need for methods and apparatuses that overcome the aforementioned problems and others.

INCORPORATION BY REFERENCE

The following publication, the disclosure of which being totally incorporated herein by reference is mentioned:

U.S. Pat. No. 6,674,899 to Nagarajan, entitled Automatic Background Detection of Scanned Documents, issued Jan. 6, 2004.

REFERENCES

US Published Patent Application 2002/0159080, entitled "Method and apparatus for background adjustment in color reproduction devices", to Feng, filed Mar. 14, 2001, describes a method for background adjustment. Pixels that have lightness levels equal to the background lightness level are mapped to a value corresponding to white as background pixels. Chroma values for the background pixels are compared to a threshold and adjusted as needed, either by adjusting the lightness value or by removing the chrominance values.

US Published Patent Application 2004/0052429, entitled "Background suppression and color adjustment method", to Curry, filed Jul. 1, 2003, describes a Gamut Enhance Module (GME) for applying 3 independent Tone Reproduction Curves (TRC) to each of the color components of an input image.

US Published Patent Application 2004/0071362, entitled "Page background detection and neutrality on scanned documents", to Curry, filed Jul. 1, 2003, describes a Statistics Module (STS) for collecting essential statistics about an image content for the purpose of applying various image enhancement operations such as page background removal and automatic neutral detection to determine if the page is gray or colored.

However, the above described references do not apply chrominance adjustment to pixels with a grayscale level lower than that of a white pixel and in accordance with a chrominance adjustment table for a smooth adjustment.

BRIEF DESCRIPTION

According to one aspect, a method is disclosed. An original image is received in a red-green-blue color space. Pixels in the original image are converted to a luminance-chrominance color spaces. Background pixels in the original image are determined by comparing a luminance value of each pixel to a selectable, adjustable luminance threshold, and comparing chrominance value of each pixel to a predetermined chrominance threshold. Chrominance values of the background pixels in each chrominance channel are adjusted.

In accordance with another aspect, a document processing system is disclosed. A device produces red-green-blue color pixel representation of an original image. A red-green-blue color space to luminance-chrominance color space converter converts values of red-green-blue pixels into luminance-chrominance pixel values. A white pixel determining processor or algorithm determines background pixels in the original image by comparing a luminance value of each pixel to a selectable, adjustable luminance threshold and comparing chrominance value of each pixel to a predetermined chrominance threshold. A chrominance values adjusting processor or algorithm adjusts chrominance values of each background pixel in each chrominance channel.

BRIEF DESCRIPTION OF THE DRAWINGS

FIG. 3 is a block diagram of a portion of the control methodology approach; and

FIG. 4 is an example of chrominance adjustment curve.

DETAILED DESCRIPTION

Figure 1:
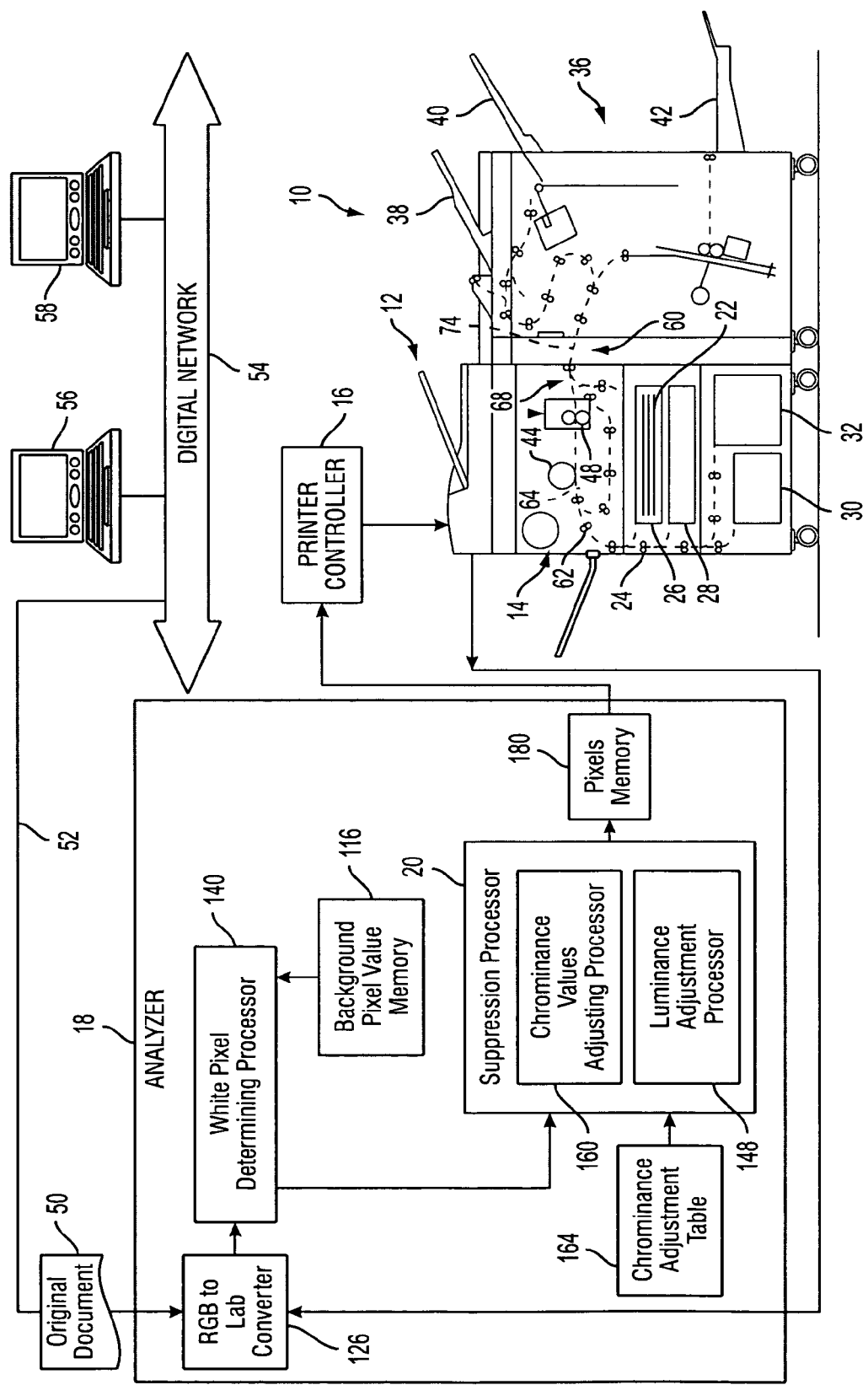
FIG. 1 is a diagrammatic illustration of a document processing system.

With reference to FIG. 1, a printing or document processing system 10 includes an image input device 12 such as a scanner, a printer such as a printing or marking engine or printer 14, and a system controller 16, all interconnected by links. The links can be wired or wireless links or other means capable of supplying electronic data to and/or from the connected elements. Exemplary links include telephone lines, computer cables, ISDN lines, and the like. The image input device 12 may include conversion electronics for converting the image-bearing documents to image signals or pixels or such function may be assumed by the marking engine 14. For example, the image input device 12 is used to scan an original document to form red-green-blue (RGB) values. The RGB color space is converted to a luminance-chrominance color space such as Lab, where L represents the luminance/lightness component and a, b are the chrominance components. As described in detail below, an analyzer 18 determines luminance and chrominance pixel values to determine background pixels. Based on the determined luminance and chrominance values, a suppression processor 20 applies to the background pixels a predetermined chrominance correction.

The marking engine 14 is fed with a print media or sheet or sheets 22 from a respective print media feeding source 24 such as a paper feeder including one or more print media sources or paper trays 26, 28, 30, 32. Each of the print media sources 26, 28, 30, 32 can store sheets of the same type of print media, or can store different types of print media. For example, the print media sources 26, 28 may store the same type of large-size paper sheets, print media source 32 may store company letterhead paper, and the print media source 30 may store letter-size paper. The print media can be substantially any type of media upon which the marking engine 14 can print, such as: high quality bond paper, lower quality "copy" paper, overhead transparency sheets, high gloss paper, and so forth. Printed media from the marking engine 14 is delivered to a finisher 36 including one or more finishing output destinations 38, 40, 42 such as trays, stackers, pans, etc. The marking engine 14 includes an imaging component 44 and an associated fuser 48.

In one embodiment, the printing system 10 is a xerographic printing system in which the marking engine 14 includes a photoconductive insulating member which is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with an imaging material such as a developing powder comprising toner particles. The toner image may subsequently be transferred to the print media, to which the toner image is permanently affixed in the fusing process. In a multicolor electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed images may be fused contemporaneously, in a single fusing process. It will be appreciated that other suitable processes for applying an image may be employed.

The fuser 48 receives the imaged print media from the image-forming component and fixes the toner image transferred to the surface of the print media substrate. The fuser 48 employed in the printer 14 can be of any suitable type, and may include fusers which apply heat or both heat and pressure to an image. For example, the fuser may apply one or more of heat or other forms of electromagnetic radiation, pressure, electrostatic charges, and sound waves, to form a copy or print. One suitable fuser includes a pair of rotating rollers spaced to define a nip through which the print media is fed. One of the rollers is heated, while the other roller may serve simply as a means of applying pressure. Other fusing members are also contemplated in place of a pair of rollers, such as belts, sleeves, drumbelts, and the like. Other suitable fusers which may be employed include radiant fusers, which apply a high-intensity flash lamp to the toner and paper.

The printing system 10 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. While the illustrated embodiment shows one marking engine 14, it will be appreciated that the printing system 10 may include more than one marking engine, such as two, three, four, six, or eight marking engines. The marking engines may be electrophotographic printers, ink-jet printers, including solid ink printers, and other devices capable of marking an image on a substrate. The marking engines can be of the same print modality (e.g., process color (P), custom color (C), black (K), or magnetic ink character recognition (MICR)) or of different print modalities.

An original document or image or print job or jobs 50 can be supplied to the printing system 10 in various ways. The built-in optical scanner 12 can be used to scan a document such as book pages, a stack of printed pages, or so forth, to create a digital image of the scanned document that is reproduced by printing operations performed by the printing system 10. Alternatively, the print jobs 50 can be electronically delivered to the system controller 16 of the printing system 10 via a wired connection 52 from a digital network 54 that interconnects example computers 56, 58 or other digital devices. For example, a network user operating word processing software running on the computer 58 may select to print the word processing document on the printing system 10, thus generating the print job 50, or an external scanner (not shown) connected to the network 54 may provide the print job 50 in electronic form. While the wired network connection 52 is illustrated, a wireless network connection or other wireless communication pathway may be used instead or additionally to connect the printing system 10 with the digital network 54. The digital network 54 can be a local area network such as a wired Ethernet, a wireless local area network (WLAN), the Internet, some combination thereof, or so forth. Moreover, it is contemplated to deliver the print jobs 50 to the printing system 10 in other ways, such as by using an optical disk reader (not illustrated) built into the printing system 10, or using a dedicated computer connected only to the printing system 10.

A print media transporting system or network or highway 60 links the print media source 24, printer 14 and finisher 36. The print media transporting system 60 includes a network of flexible paper pathways that feeds to and collects from each of the printers. The print media transporting system 60 may comprise drive members, such as pairs of rollers 62, spherical nips, air jets, or the like. The system 60 may further include associated motors for the drive members, belts, guide rods, frames, etc. (not shown), which, in combination with the drive members, serve to convey the print media along selected pathways at selected speeds. In the illustrated embodiment, the print media from the source 24 is delivered to the printer 14 by a pathway 64 which is common to the trays 26, 28, 30, 32. The print media is printed by the imaging component 44 and fused by the fuser 48. A pathway 68 from the printer 14 merges into a pathway 74 which conveys the printed media to the finisher 36.

The pathways 64, 68, 74 of the network 60 may include inverters, reverters, interposers, bypass pathways, and the like as known in the art. It will be appreciated that the printer 14 may be configured for duplex or simplex printing and that a single sheet of paper may be marked by two or more of the printers or marked a plurality of times by the same printer, for example, by providing internal duplex pathways.

Figure 2:
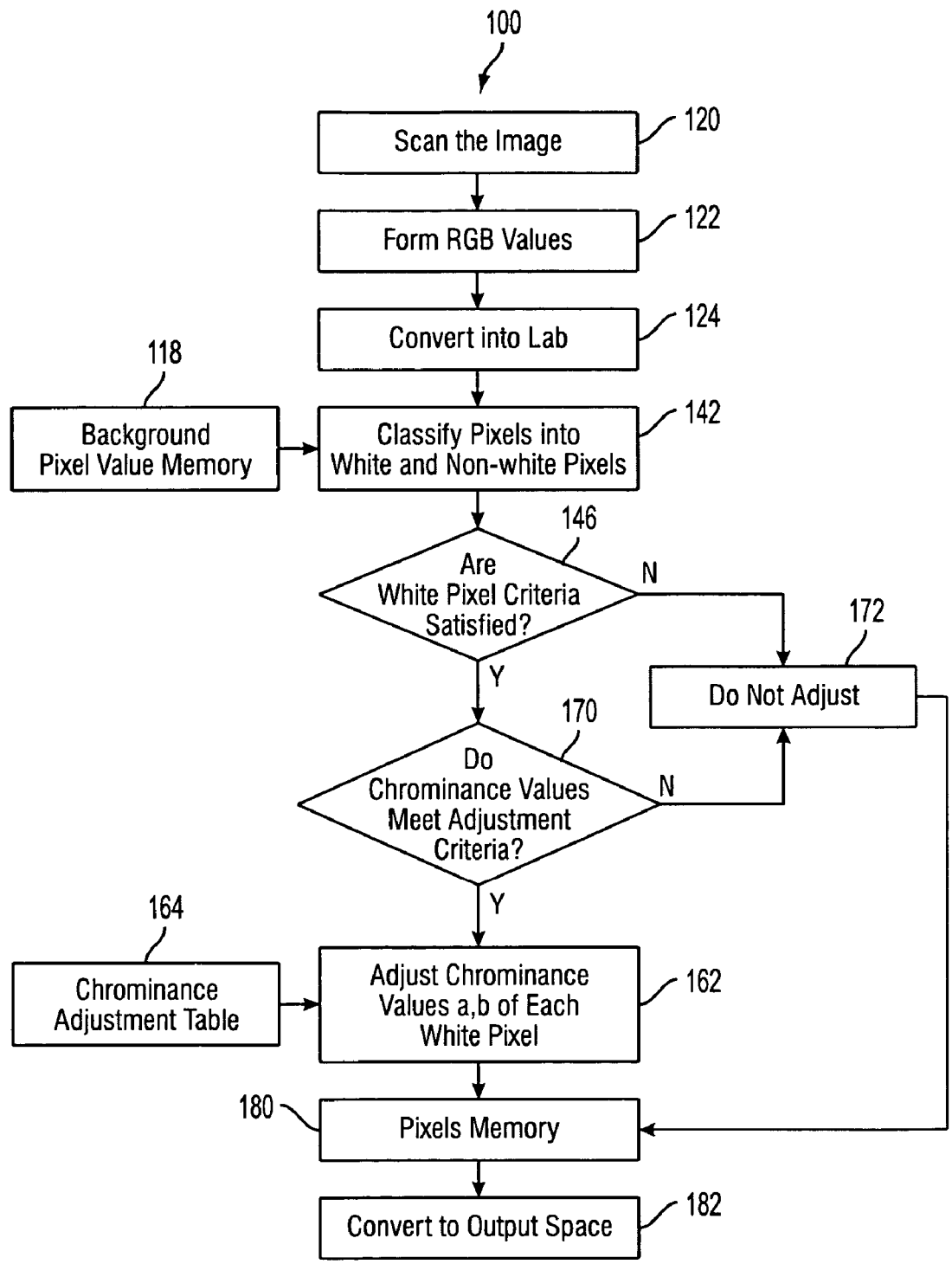
FIG. 2 is a block diagram of a control methodology approach.

With reference to FIGS. 2 and 3, a control methodology approach 100 controls background suppression in the document processing system 10. A sample sheet or image is scanned 110 by the scanner 12 to generate a digital representation of the scanned sheet. A background level or background pixel value is determined 112 by one of known methods as, for example, one of the methods described in the U.S. Pat. No. 6,674,899 to Nagarajan. For example, determining the background value of a document includes compiling a histogram of the image intensity values from pixels within the selected document area. The histogram background peak, the standard deviation from the peak, and a white pixel or background pixel or luminance threshold $T_w$ are determined 114. The background peak value is the gray scale level with greatest number of pixels having an intensity related to the background level value or the white pixels values of the image being scanned. Optionally, or alternatively, the white pixel threshold $T_w$ is a predetermined value. For example, the white pixel threshold $T_w$ can be determined or prespecified to be equal to 220, 230, ..., etc. depending on the calibration of the input device 12 and/or user preferences. The background pixel threshold value $T_w$ is stored 116 in a background pixel value memory 118.

With continuing reference to FIG. 2 and reference again to FIG. 1, an original image or document to be processed is scanned 120 by the scanner 12 to form RGB values 122. Of course, it is contemplated that the original document can be delivered to the analyzer 18 by other means as described above. The RGB values of pixels are converted 124 to a luminance-chrominance color space (Lab) by an RGB to Lab converter 126 to determine luminance L* value and chrominance values a, b of each pixel. A white pixel determining processor or algorithm or means 140 classifies 142 each pixel as a white pixel or a non-white pixel. More specifically, a pixel is determined as a "white" pixel if it meets the following white pixel criteria 146:

$L > = T_w - \Delta T$, and $\max(|a-\Delta A|, |b-\Delta B|) + [\min(|a-\Delta A|, |b-\Delta B|)/2] < T_C$, where L is the determined luminance value of the pixel, a is the determined chrominance pixel value in a first chrominance channel, b is the determined chrominance pixel value in a second chrominance channel, $T_w$ is the background pixel threshold, $T_C$ is a chrominance threshold value, $\Delta T$ is an adjustable white pixel threshold parameter or white pixel or luminance threshold offset, and $\Delta A$ is an adjustable chrominance parameter or chrominance value offset in the first channel, and $\Delta B$ is an adjustable chrominance parameter or chrominance value offset in the second channel.

The white pixel threshold offset $\Delta T$ allows the user to extend the background suppression to the pixels which have luminance values below the background pixel threshold value $T_w$. In one embodiment, in which the background value threshold $T_w$ is less than 255, a luminance adjustment processor or algorithm or means 148 adjusts the luminosity of pixels to be equal to 255. Optionally, the luminosity adjustment processor 148 adjusts the luminosity of pixels, which have the luminance value L less than the white pixel threshold $T_w$, to higher values to avoid color discontinuity.

The chrominance value is compared to a prespecified chrominance threshold $T_C$ to ensure that the chrominance value is substantially low. Of course, it is contemplated that other equations to determine the chrominance value can be used in place of the approximation above, such as, for example, $\sqrt{a^2+b^2}$. Only if both conditions described above are met, the chrominance values a, b are adjusted as described below. This ensures that the background is reproduced cleanly, without dots; while the integrity color in the print is preserved.

A chrominance values adjusting processor or algorithm or means 160 adjusts 162 the chrominance values a, b of each determined white pixel via a chrominance adjustable table 164. The chrominance values adjustment table 164 is created in advance, for example, by a user. One example of such table is Table 1 below.

TABLE 1

| Index/Input | Value/Output |
|---|---|
| 0 | 112 |
| 1 | 113 |
| 2 | 114 |
| 3 | 115 |
| 4 | 116 |
| 5 | 117 |
| 6 | 118 |
| 7 | 119 |
| 8 | 122 |
| 9 | 124 |
| 10 | 126 |
| 11 | 127 |
| 12 | 128 |
| 13 | 128 |
| 14 | 128 |
| 15 | 128 |
| 16 | 128 |
| 17 | 128 |
| 18 | 128 |
| 19 | 128 |
| 20 | 128 |
| 21 | 129 |
| 22 | 130 |
| 23 | 132 |
| 23 | 134 |

TABLE 1-continued

| Index/Input | Value/Output |
|---|---|
| 25 | 137 |
| 26 | 138 |
| 27 | 139 |
| 28 | 140 |
| 29 | 141 |
| 30 | 142 |
| 31 | 143 |

An index column represents an index or a number of input entries ind, which, in this example, is equal to thirty two entries. A value column represents an adjusted chrominance output value $a_{out}$, $b_{out}$ in the first and second chrominance channels as discussed in detail below. A range of values in the value column is selected to adjust the only the pixels which have chrominance values a, b close to a neutral value, e.g. 128. A starting point $a_{start}$, $b_{start}$ in the Table 1 is the chrominance grayscale value of 112, and an ending point $a_{end}$, $b_{end}$ in the Table 1 is the chrominance grayscale value of 143. The memory required for the adjustment table with the limited number of entries is substantially smaller than the memory required for the conversion of all pixel levels. Of course, it is also contemplated that different chrominance adjustable tables can be used for each chrominance channel. The different chrominance adjustable tables are especially beneficial where the distribution in the first and second chrominance channels is different from one another.

With continuing reference to FIG. 2, the chrominance values a, b of each white pixel are adjusted 162 if the chrominance values a, b meet the adjustment criteria 170. Otherwise, the white pixels chrominance values are not adjusted 172. More specifically, only the determined white pixels with the chrominance values in the first chrominance channel which have a distribution about the neutral grayscale value in a prespecified range [$a_{start}$; $a_{end}$] are adjusted:

$$a>=a_{start} \&\& a<=a_{end}, \quad (1)$$

where a is the determined chrominance pixel value in the first chrominance channel, $a_{start}$ is a user defined parameter representing a starting grayscale value, beginning with which the chrominance pixel values of the first channel are adjusted; and $a_{end}$ is a user defined programmable parameter representing an ending grayscale value of the chrominance adjustment table 164.

The output chrominance values in the first channel of the white pixels, which satisfy the Equation (1), are adjusted as a function of the index ind:

$$a_{out}=f(\text{ind})$$

$$\text{ind}=a-a_{start},$$

where $a_{out}$ is the adjusted chrominance value in the first channel;

$a_{start}$ is a user defined parameter representing a starting grayscale value, beginning with which the chrominance pixel values of the first chrominance channel are adjusted; and ind represents an entry in the chrominance adjustment table 164.

The chrominance values of the white pixels in the second chrominance channel are adjusted 162 in the like manner. Initially, it is determined which of the white pixels has the chrominance values in the second chrominance channel which have the distribution about the neutral grayscale value in the prespecified range [$b_{start}$; $b_{end}$]:

$$b>=b_{start} \&\& b<=b_{end}, \quad (2)$$

where b is the determined chrominance pixel value in the second chrominance channel;

$b_{start}$ is a user defined parameter representing a starting grayscale value, beginning with which the chrominance pixel values of the channel b are adjusted; and $b_{end}$ is a user defined parameter representing an ending grayscale value of the chrominance adjustment table 164.

The chrominance values in the chrominance channel b of the white pixels which satisfy the Equation (2) are adjusted as a function of the index ind:

$$b_{out}=f(\text{ind})$$

$$\text{ind}=b-b_{start},$$

where $b_{out}$ is an adjusted chrominance value in the second channel;

$b_{start}$ is a user defined parameter representing a starting grayscale value, beginning with which the chrominance pixel values of the second channel are adjusted; and ind represents an entry in the chrominance adjustment table 164.

Adjusted and non-adjusted pixels are stored in a pixels memory 180. A printer controller 16 converts all the pixels of the image to an output space 182.

With reference to FIG. 4, an example of the chrominance adjustment curve is shown. Only the pixels which chrominance values are determined to be near the neutral grayscale value, e.g. 128, are adjusted, while other pixels retain the original grayscale values. For instance, a first white pixel has the chrominance value a equal to 113 and the chrominance value b equal to 115. The first white pixel is adjusted as follows:

$$\text{ind}_a=113-112=1$$

$$a_{out}=f(1)=113$$

$$\text{ind}_b=115-112=3$$

$$b_{out}=f(3)=115$$

The chrominance values a, b of the first pixel are not adjusted, e.g. $a_{out}$=113, $b_{out}$=115. A second white pixel with the chrominance value a equal to 122 and the chrominance value b equal to 124 is adjusted as follows:

$$\text{ind}_a=122-112=10$$

$$a_{out}=f(10)=124$$

$$\text{ind}_b=124-112=12$$

$$b_{out}=f(12)=128$$

The chrominance values a, b of the second pixel are adjusted to corresponding new values 124, 128.

In this manner, the white pixels are adjusted continuously in the first and second chrominance channels, e.g. pixels with the values that fall closer to the neutral grayscale value are adjusted the most, while the pixels with the values that fall further away from the neutral grayscale value are adjusted the least. This results in the smooth transition from the adjusted pixels to the pixels that are not adjusted. The adjustment of the chrominance channels is selectively determined by the luminance as well as chrominance values associated with the input pixel. The control approach 100 limits chrominance suppression to the background area, without affecting the color in the non-background areas.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of transforming an original image from a red-green-blue (RGB) color space representation to a luminance-chrominance (Lab) color space representation, comprising:
   receiving an original image in a red-green-blue color space at an analyzer of a document processing system;
   converting pixels in the original image from the RGB color space to a luminance chrominance color space using an RGB to Lab converter;
   determining background pixels in the original image using a background pixel determining processor, including:
      comparing a luminance value (L) representation of each pixel in the Lab color space to a selectable, adjustable luminance threshold value,
      comparing a chrominance value (ab) representation to a predetermined chrominance threshold value for each pixel in the Lab color space for which the luminance value representation exceeds the luminance threshold value; and
      identifying pixels having chrominance value representations less than the predetermined chrominance threshold value as background pixels; and
   variably adjusting the chrominance value (ab) representation of pixels of the original image for each background pixel in the Lab color space having a chrominance value representation in a neutral chrominance range defined by a start chrominance value less than a neutral chrominance value and an end chrominance value greater than the neutral chrominance value using a background pixel adjusting processor, the variable adjusting based at least in part on a functional relationship of the chrominance value representation to a prespecified chrominance adjustment table associated with the neutral chrominance range.

2. The method of claim 1, wherein the selectable luminance threshold value is equal to a difference between a reference luminance threshold value and a luminance threshold value offset.

3. The method of claim 1 further including:
   prior to the variable adjusting, creating the chrominance adjustment table associated with the neutral chrominance range and wherein the variable includes:
      adjusting the chrominance value representation of background pixels in the neutral chrominance range based on the chrominance adjustment table.

4. The method of claim 3, further including:
   prior to creating the chrominance adjustment table, determining the neutral chrominance value; and
   determining the neutral chrominance range based at least in part on start and end chrominance values which lie in a neighborhood of the neutral chrominance values.

5. The method of claim 4, wherein the variable adjusting further includes:
   continuously smoothly adjusting the chrominance value representation of background pixels to adjust the chrominance value representation of background pixels closest to the neutral chrominance value the most and the chrominance value representation of background pixels furthest from the neutral chrominance value the least.

6. The method of claim 1, further including:
   prior to the variable adjusting, creating a first chrominance adjustment table associated with a first neutral chrominance range for a first chrominance channel (a); and
   creating a second chrominance adjustment table associated with a second neutral chrominance range for a second chrominance channel (b), wherein the variable adjusting includes:
      adjusting the chrominance value representation for the first chrominance channel of the background pixels in the first neutral chrominance range based on the first chrominance adjustment; and
      adjusting the chrominance value representation for the second chrominance channel of the background pixels in the second neutral chrominance range based on the second chrominance adjustment table.

7. The method of claim 6, further including:
   prior to creating the first and second chrominance adjustment tables, determining a first neutral chrominance value associated with the first chrominance adjustment table;
   determining the first neutral chrominance range based at least in part on first start and first end chrominance values which lie in a neighborhood of the first neutral chrominance value;
   creating a second neutral chrominance value associated with the second chrominance adjustment table; and
   determining the second neutral chrominance range based at least in part on second start and second end chrominance values which lie in a neighborhood of the second neutral chrominance value.

8. The method of claim 1, further including:
   variably adjusting the luminance value representation of at least some background pixels for which the luminance value representation is in a luminance range from the luminance threshold value to a predetermined maximum luminance value based at least in part on a functional relationship of the pixel luminance value representation to the luminance range.

9. The method of claim 8 wherein the luminance value (L) representation of pixels of the original image for each background pixel in the Lab color space having a luminance value representation above the predetermined maximum luminance value is not adjusted.

10. The method of claim 1, wherein the document processing system includes a xerographic marking engine.

11. The method of claim 1, further including:
    variably adjusting the chrominance value representation for each chrominance channel of each background pixel having a chrominance value representation for the corresponding chrominance channel in the neutral chrominance range based at least in part on a functional relationship of the chrominance value representation for the corresponding chrominance channel value to the neutral chrominance range.

12. The method of claim 1 wherein the chrominance value (ab) representation of pixels of the original image for each background pixel in the Lab color space having a pixel chrominance value representation above the neutral chrominance range is not adjusted.

13. A document processing system comprising:
   a device for producing a red-green-blue color space representation of an original image;
   a red-green-blue color space to luminance-chrominance color space converter for converting red-green-blue pixel values for the original image in the red-green-blue (RGB) color space into corresponding luminance-chrominance pixel values in the luminance-chrominance (Lab) color space;
   a white pixel determining processor for determining background pixels in the original image by comparing a luminance value (L) representation of each pixel in the Lab color space to a selectable, adjustable luminance threshold value, and comparing a chrominance value (ab) representation to a predetermined chrominance threshold value for each pixel in the Lab color space for which the luminance value representation exceeds the luminance threshold value to identify pixels having chrominance value representations less than the predetermined chrominance threshold value as background pixels;
   a chrominance value adjusting processor for variably adjusting the chrominance value (ab) representation of pixels of the original image for each background pixel in the Lab color space having a chrominance value in a neutral chrominance range defined by a start chrominance value less than a neutral chrominance value and an end chrominance value greater than the neutral chrominance value based at least in part on a functional relationship of the chrominance value representation to the neutral chrominance range; and
   a chrominance adjustment table associated with the neutral chrominance range for adjusting the chrominance value representation of background pixels in the neutral chrominance range based on the chrominance adjustment table.

14. The system of claim 13, wherein the selectable luminance threshold value is equal to a difference between a reference luminance threshold value and a luminance threshold value offset.

15. The system of claim 13, the chrominance adjustment table further including: a first chrominance adjustment table associated with a first neutral chrominance range for adjusting the chrominance value representation for a first chrominance channel (a) of the background pixels in the first neutral chrominance range; and
   a second chrominance adjustment table associated with a second neutral chrominance range for adjusting the chrominance value representation for a second chrominance channel (b) of the background pixels in the second neutral chrominance range.

16. The system of claim 13, further including:
   a luminance adjustment processor which variably adjusts the luminance value representation of at least some background pixels for which the luminance value representation is in a luminance range from the luminance threshold value to a predetermined maximum luminance value based at least in part on a functional relationship of the pixel luminance value representation to the luminance range.

17. A method of transforming an original image from a red-green-blue (RGB) color space representation to a luminance-chrominance (Lab) color space representation, comprising:
   receiving an original image in a red-green-blue color space at an analyzer of a document processing system;
   converting pixels in the original image from the RGB color space to a luminance-chrominance color space using an RGB to Lab converter;
   determining background pixels in the original image using a background pixel determining processor, including:
      comparing a luminance value (L) representation of each pixel in the Lab color space to a first luminance threshold,
      comparing a chrominance value (ab) representation to a predetermined chrominance threshold for each pixel in the Lab color space for which the luminance value representation exceeds the first luminance threshold; and
      identifying pixels having chrominance value representations less than the predetermined chrominance threshold as background pixels; and
   variably adjusting the chrominance value (ab) representation of pixels of the original image for each background pixel in the Lab color space having a chrominance value representation in a neutral chrominance range using a background pixel adjusting processor based at least in part on a relationship of the pixel chrominance value representation to a prespecified chrominance adjustment table associated with the neutral chrominance range.

18. The method of claim 17, further comprising:
   variably adjusting the luminance value representation of background pixels which have luminance value representations less than a second luminance threshold based at least in part on a functional relationship of the luminance value representation to a luminance range from the first luminance threshold to a predetermined maximum luminance value, the second luminance threshold being higher than the first luminance threshold; and
   adjusting the luminance value representation of remaining background pixels to the predetermined maximum luminance value.

19. The method of claim 17, further including:
   variably adjusting the chrominance value representation for each chrominance channel of each background pixel having a chrominance value representation for the corresponding chrominance channel in the neutral chrominance range based at least in part on a relationship of the chrominance value representation for the corresponding chrominance channel to the prespecified chrominance adjustment table.

* * * * *